No. 821,716. PATENTED MAY 29, 1906.
F. C. HOOD.
MACHINE FOR WASHING RUBBER.
APPLICATION FILED MAR. 14, 1905.
3 SHEETS—SHEET 2.
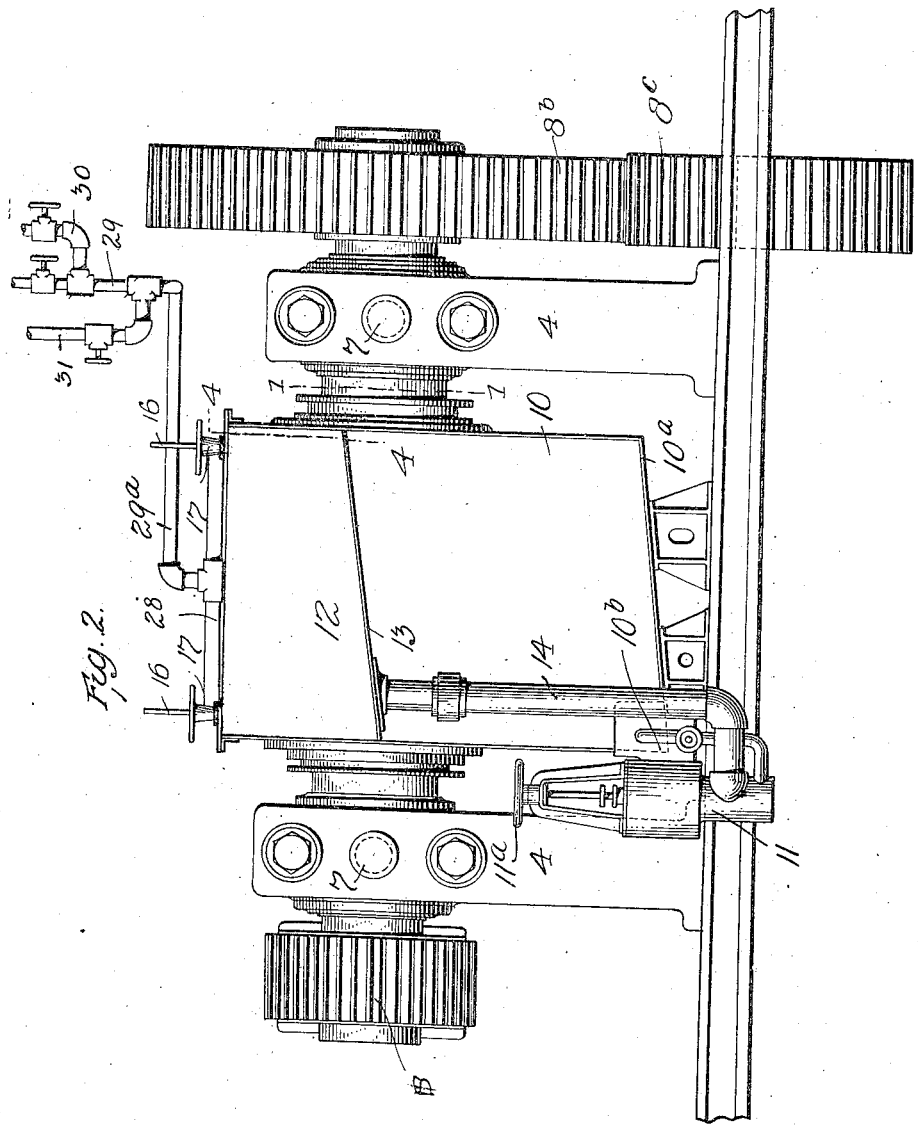

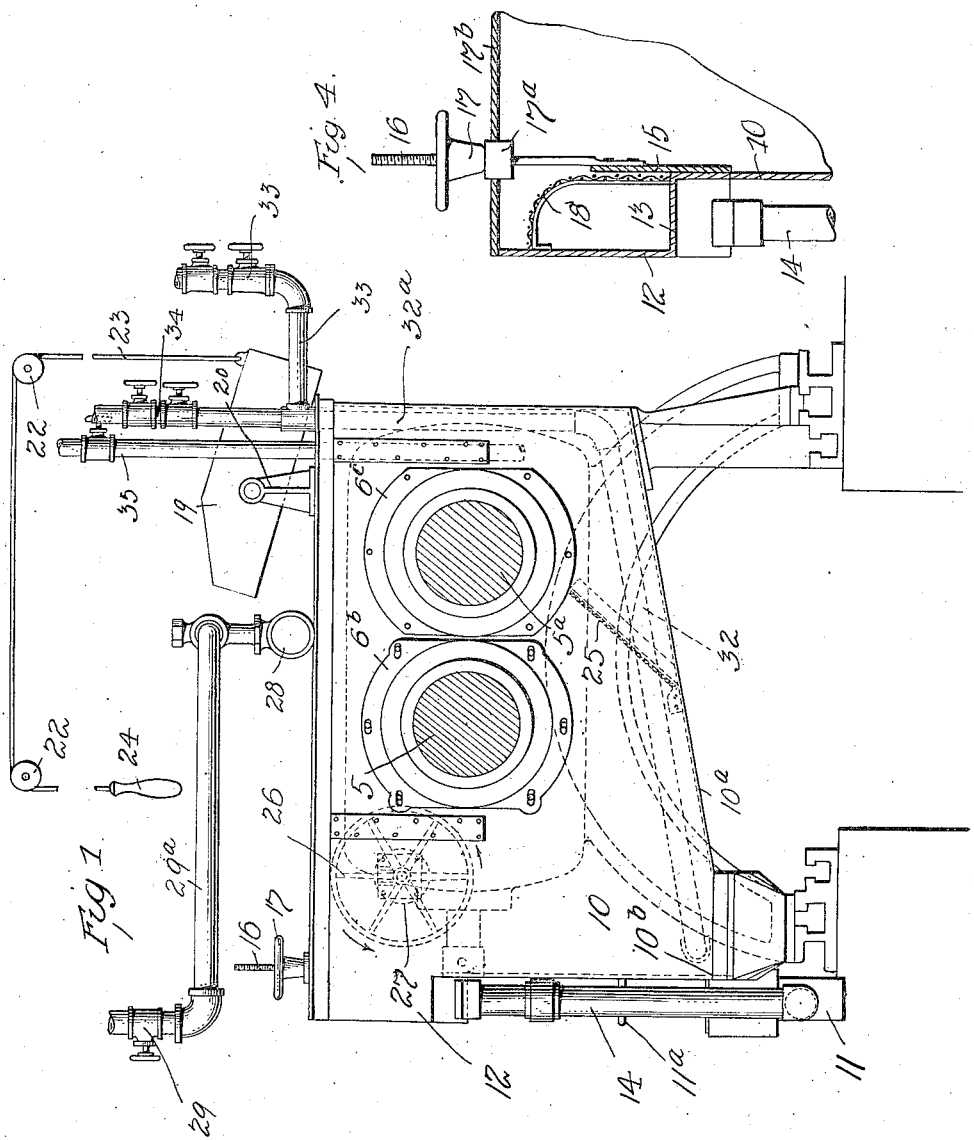

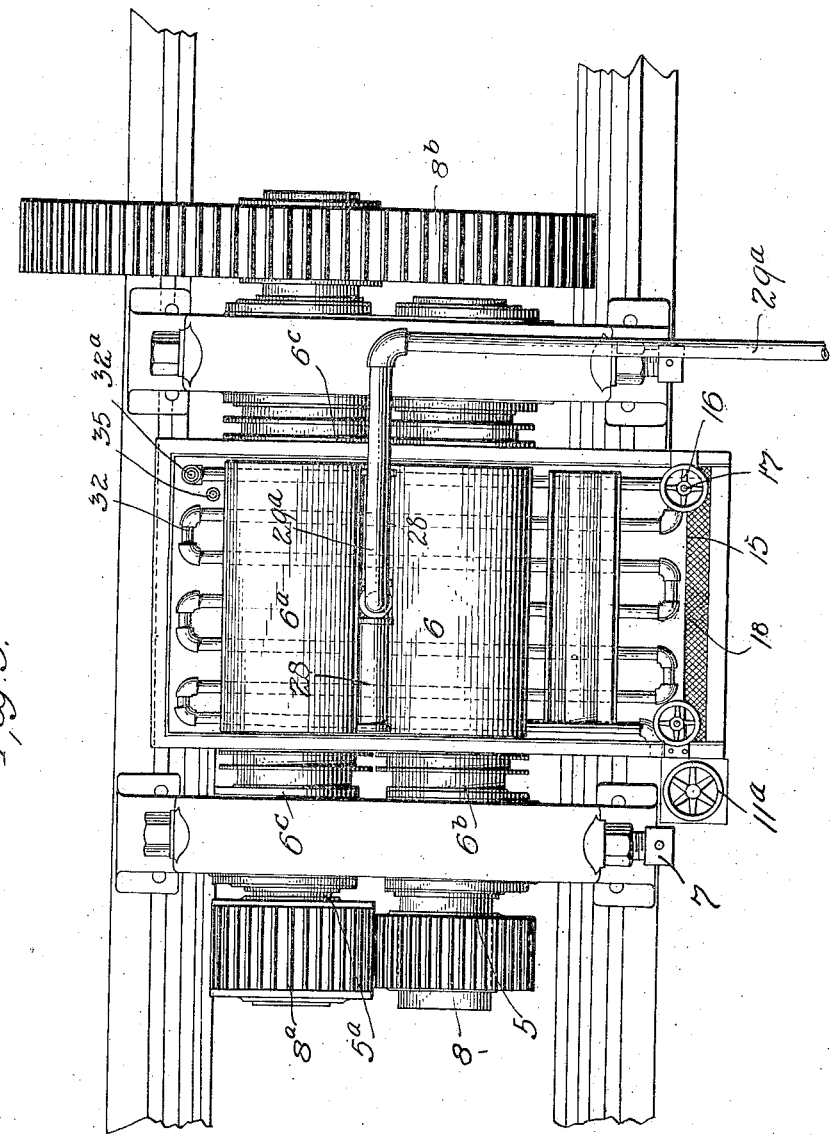

UNITED STATES PATENT OFFICE.

FREDERIC C. HOOD, OF BROOKLINE, MASSACHUSETTS.

MACHINE FOR WASHING RUBBER.

No. 821,716.　　　　Specification of Letters Patent.　　　Patented May 29, 1906.

Application filed March 14, 1905. Serial No. 250,109.

*To all whom it may concern:*

Be it known that I, FREDERIC C. HOOD, a citizen of the United States, residing at Brookline, Massachusetts, have invented certain new and useful Improvements in Machines for Washing Rubber, of which the following is a specification.

My invention relates to an improved machine for washing rubber, and while designed more especially for washing crude and reclaimed rubber to remove the impurities therefrom is adapted as well for washing gutta-percha, reclaimed rubber, and various other materials.

The washing of the crude and reclaimed rubber, gutta-percha, and various other like materials, which forms one of the most important operations in rubber manufacturing, is at the present time universally carried out by passing the material through a machine known as a "rubber-washer" having two or more rotating rolls which possess either smooth, corrugated, or diamond-cut surfaces. To facilitate the removal of the mechanical impurities, a jet or sheet of water is allowed to fall upon the rubber or like material as it passes between the nip of the rolls. While for the washing of high and medium-fair rubbers this arrangement is on the whole considered fairly satisfactory, it has been found entirely inadequate to produce perfectly-washed sheets from all those rubbers containing sand, earthy matter, bark, wood, and other vegetable debris, chemical and all other impurities. This is often due to the fact that the rubber passing through the rolls becomes more or less heated by their mechanical action, and the above-named impurities are caused to adhere to the rubber and instead of being removed by the next passage of the rubber through these rolls they are ground into the rubber and can no longer be removed from it. It is thus found that all grades of rubber containing material quantities of the above-named impurities at the end of the washing operation still contain a considerable portion of these impurities which has been ground into the rubber. Particularly in the case of vegetable impurities their presence in the rubber in a finely-comminuted state is liable to cause blowing in the subsequent vulcanization—in fact, to give rise to quite a number of manufacturing troubles.

I have found that by providing an apparatus in which during the washing operation the rubber sheet is submerged in the washing liquid a great improvement in the purity of the washed sheet is effected, and this improvement is particularly marked in the case of those very impure or adulterated grades of rubber which at the present time cannot be satisfactorily washed at all. By my improved apparatus I also effect a great saving in time and a material reduction in labor and consequent lessening of cost.

I accordingly provide a machine or apparatus in which the washing-rolls are immersed in liquid, so that the level of the liquid in the tank containing the rolls rises to a height above the nip of the rolls, and then the rolls are rotated, so that the rubber as it passes between the nip of the rolls is flooded with the washing liquid, and any impurities which have come to the surface of the rubber sheet are thus at once floated off or deposited at the bottom of the tank, and the sheet itself rises automatically toward the surface of the liquid, where it passes over and is caught by and carried through the rolls. This operation is continued by the use of one or a series of these machines until the sheet is found to be washed to the requisite state of purity. The dirt and impurities collecting at the bottom of the immersion-tank may be periodically removed or continually carried off by means of a pipe leading from the bottom of the tank, while the lighter impurities or those having less specific gravity are floated off at the surface of the liquid.

I use the term "liquid" because while water alone is generally used it may be desirable to add chemicals to the water or to substitute for the water other liquids having a specific solvent or chemical effect, and I have shown means for accomplishing this purpose in the drawings.

Some grades of rubber contain impurities which are best removed by the application of warm or hot water which has a dissolving action thereon, and a further improvement in my apparatus lies in providing means by which the temperature of the liquid may be raised after the rubber has been subjected to the action of cold liquid.

I have shown an embodiment of my improved apparatus in the accompanying drawings, in which—

Figure 1 is a sectional elevation, the section being indicated by line 1 1 of Fig. 2; Fig. 2, a front view. Fig. 3 is a plan view with the hopper omitted, and Fig. 4 is a sectional detail on line 4 4 of Fig. 1.

In the drawings I have shown at 4 4 a suitable frame, in which are journaled the supporting-shafts 5 5ª of the rollers 6 and 6ª, which, as shown, are preferably located side by side. The bearings of one of the rollers 6 are made horizontally adjustable to a limited extent to permit the distance between the rolls to be varied, the adjustment being effected by the screw-bolts 7, having their heads adapted for the reception of a suitable operating-tool.

The shafts 5 and 5ª are provided at one side with intermeshing gears 8 and 8ª, and one of them is provided at the opposite side of the machine with a large gear-wheel 8ᵇ, through which power is imparted to the machine by a gear 8ᶜ, driven from any suitable source. (Not shown.) The washing-rolls are surrounded by a tank 10, the bottom 10ª of which slopes both to the front and to one side, so that all matters washed out by the liquid and which are of greater specific gravity tend to settle toward one corner of the machine. This corner 10ᵇ is connected to an outlet-pipe 11, which is provided with a gate-valve 11ª, by which the outflow of liquid may be regulated or stopped, as desired.

At the upper front side is an extended portion 12, into which the surface liquid flows, carrying with it all impurities, this extended portion having an inclined bottom 13, which communicates at its lower end with a vertical pipe 14, communicating with the pipe 11, above referred to. A vertically-sliding gate or ledge 15 is provided, which may be raised and lowered by means such as the threaded rods 16 and hand-nuts 17, so that the height of liquid in the tank may be varied. The rods pass through and the nuts 17 bear on blocks 17ª, secured to the flanges 17ᵇ of the tank. A screen 18 of suitable mesh is also provided to prevent the possible loss of any fragments of rubber. Plates 6ᵇ and 6ᶜ are provided which encircle the shafts of the rolls and are bolted to the sides of the tank, so as to hold suitable packing in place and prevent leakage.

At 19 in Fig. 1 I have shown a tilting hopper pivotally supported upon suitable brackets 20, into which the crude rubber to be washed is thrown by the attendant, this hopper being omitted from Figs. 2 and 3 in order to show the other parts.

Ordinarily the pan rests in the position shown in readiness to receive the crude rubber, and means are provided by which the attendant may tilt it from the front of the machine when the batch of washed rubber has been removed and a fresh lot of unwashed rubber is to be supplied. A convenient form of means for this purpose consists of a cord or chain 23, connected to the rear of the hopper and passing over pulleys 22 to the front of the tank, when it is provided with a handle 24.

When a fresh charge of rubber is dumped upon the rollers, it is carried through between them, and after passing between usually forms itself in a crinkled or irregular sheet, though, according to the temperature of liquid and kind of liquid, it may be in small particles. An inclined screen 25 deflects this toward the front of the tank where owing to its lightness it at once rises to the surface of the liquid. In order to insure these strips, films, sheets, or particles being automatically returned to the nip of the rollers, so as to be again drawn down between the same, I provide a paddle-wheel 26, having its supporting-shaft removably journaled in bearing-boxes 27. If this paddle-wheel be rotated by any suitable means in the direction of the arrow, the sheet or film of rubber will be seized by the blades and be carried back onto the top of the adjoining roller and thence down between the rolls without necessitating the handling of the rubber by the workman at this time.

The washing liquid is preferably supplied to the machine by a horizontal pipe 28, having delivery-openings in its under side. This pipe 28 is located, preferably, directly over the meeting line or nip of the rolls. A water-supply pipe 29 connects with this pipe 28 by a horizontal pipe 29ª, while a steam-supply pipe 30 connects with the pipe 29, by which the temperature of the water may be varied as desired. A pipe 31 also connects with the pipe 29, by which chemicals may be mingled with the water when desired. Pipes 30 and 31 are shown only in Fig. 2 and omitted from Figs. 1 and 3 for convenience.

I may find it desirable to provide additional means for varying the temperature of the washing liquid, in which event I provide a pipe-coil 32 in the bottom of the tank with branch-pipe connections 33 and 34 to the vertical portion 32ª for refrigerating fluid and steam, respectively, with suitable controlling-cocks, whereby the body of water in the tank may be directly acted upon. Branch pipes 33 and 34 are for convenience shown only in Fig. 1. A pipe 35 may be provided for extra water.

Having thus described my invention, what I claim is—

1. In a device for washing rubber, a tank, a pair of coacting rolls therein at a fixed elevation and means for maintaining the washing liquid therein at a height above the nip of the rolls, substantially as described.

2. In a device for washing rubber, a tank, a pair of coacting rolls journaled therein with means for operating them, means for supplying washing liquid thereto to maintain a level above the nip of the rolls, and a liquid-outlet at the surface for removing floating impurities, substantially as described.

3. In a device for washing rubber, a tank, a pair of coacting rolls journaled therein, an outlet at the bottom of the tank, a second outlet from the surface, and means whereby liquid may be supplied to the tank in excess of that passing out by the bottom outlet, substantially as described.

4. In a device for washing rubber, a tank, a pair of coacting rolls journaled therein, means for maintaining liquid in said tank at a level above the nip of the rolls, and means for automatically returning the rubber to the nip of the rolls as it rises to the surface, substantially as described.

5. In a device for washing rubber, a tank, a pair of coacting rolls journaled therein, means for supplying liquid to the tank, a liquid-outlet near the upper part of the tank, and a device located between the rolls and said outlet and operated so as to automatically return the rubber to the upper side of the rolls, substantially as described.

6. In a device for washing rubber, a tank, a pair of rolls journaled therein in the same horizontal plane, means located above the nip of the rolls for supplying hot and cold liquid thereto, upper and lower water-outlets from said tank with means for regulating the flow of liquid therethrough, substantially as described.

7. In a device for washing rubber, a tank, a pair of rolls journaled side by side therein, a liquid-supply, a surface outlet at the front of the machine where the washed rubber is removed, a tilting hopper at the back of the machine for holding a charge of unwashed rubber, and means extending to the front of the machine for tilting said hopper to deliver its contents upon the rolls, substantially as described.

8. In a device for washing rubber, a tank, a liquid-supply thereto, washing-rolls journaled therein in the same horizontal plane, a liquid-outlet from the tank above the level of the nip of the rolls, and means located in the tank for varying the temperature of the liquid therein, substantially as described.

In testimony whereof I affix my signature in presence of two witnesses.

FREDERIC C. HOOD.

Witnesses:
CLINTON T. FISHER,
HERBERT C. MASON.